United States Patent
Roosa

(10) Patent No.: US 6,223,692 B1
(45) Date of Patent: May 1, 2001

(54) DEBRIS CATCHING TROUGH

(76) Inventor: Donald J. Roosa, 6 Cronk Pl., Hyde Park, NY (US) 12538-1909

( * ) Notice: Subject to any disclaimer, the term of this patent is extended or adjusted under 35 U.S.C. 154(b) by 0 days.

(21) Appl. No.: 09/365,039

(22) Filed: Jul. 30, 1999

(51) Int. Cl.⁷ ................................................. A01K 31/06
(52) U.S. Cl. ..................... 119/463; 119/462; 119/469; 119/479
(58) Field of Search ........................ 119/463, 462, 119/467, 469, 479, 61, 52.2, 57.4, 52.1

(56) References Cited

U.S. PATENT DOCUMENTS

| | | |
|---|---|---|
| 99,164 * | 1/1870 | Colburn . |
| 1,186,782 * | 6/1916 | Hercer . |
| 2,028,612 * | 1/1936 | Kosvich . |
| 2,045,472 * | 6/1936 | Kearney et al. . |
| 5,033,411 * | 7/1991 | Brucker .............................. 119/52.2 |
| 5,088,445 * | 2/1992 | Brindamour ......................... 119/469 |
| 5,884,581 * | 3/1999 | Vandaele ............................ 119/52.4 |
| 5,988,111 * | 11/1999 | Kujath ................................ 119/469 |

* cited by examiner

Primary Examiner—Charles T. Jordan
Assistant Examiner—Yvonne R. Abbott

(57) ABSTRACT

A debris catching trough for debris catching troughs for depending below a bird cage for collecting debris that falls out from the sides of the bird cage. The debris catching trough includes an open trough having spaced apart inner and outer side walls and a bottom wall connecting the inner and outer side walls of the trough together, the inner side wall of the trough defining a central opening. A plurality of spaced apart hangers upwardly extend from the bottom face of the trough to permit hanging of said ring trough beneath a bird cage.

10 Claims, 3 Drawing Sheets

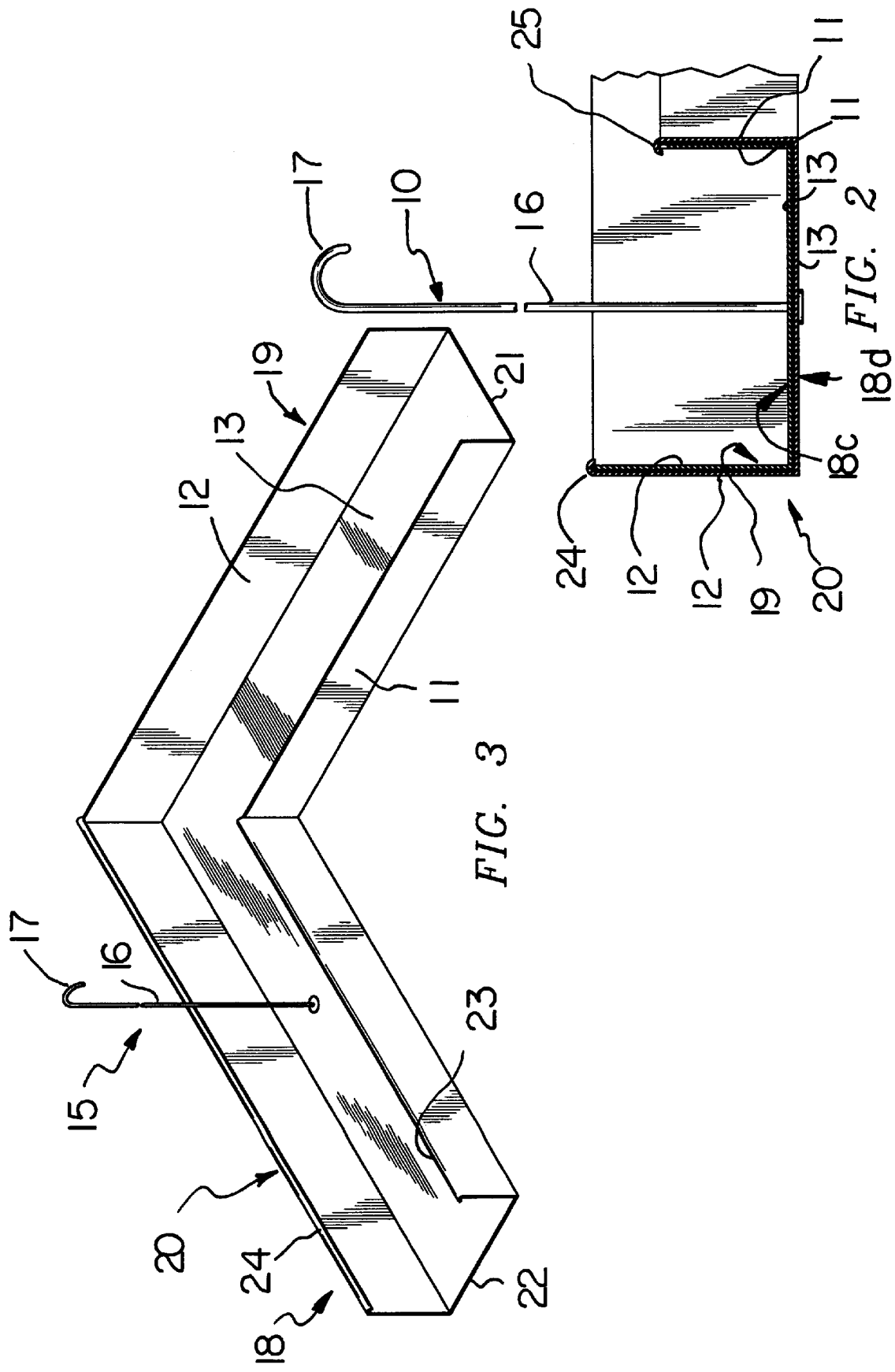

DEBRIS CATCHING TROUGH

BACKGROUND OF THE INVENTION

1. Field of the Invention

The present invention relates to debris catching troughs for depending below a bird cage and more particularly pertains to a new debris catching trough for debris catching troughs for depending below a bird cage for collecting debris that falls out from the sides of the bird cage.

2. Description of the Prior Art

The use of debris catching troughs for depending below a bird cage is known in the prior art. More specifically, debris catching troughs for depending below a bird cage heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 2,028,612; U.S. Pat. No. 1,094,423; U.S. Pat. No. 2,045,472; U.S. Pat. No. 5,201,278; U.S. Pat. No. 1,460,102; and U.S. Pat. No. Des. 384,778.

While these devices fulfill their respective, particular objectives and requirements, the aforementioned patents do not disclose a new debris catching trough. The inventive device includes an open ring trough having spaced apart inner and outer side walls and a bottom wall connecting the inner and outer side walls of the ring trough together, the inner side wall of the ring trough defining a central opening. A plurality of spaced apart hangers upwardly extend from the bottom face of the ring trough to permit hanging of said ring trough beneath a bird cage.

In these respects, the debris catching trough according to the present invention substantially departs from the conventional concepts and designs of the prior art, and in so doing provides an apparatus primarily developed for the purpose of debris catching troughs for depending below a bird cage for collecting debris that falls out from the sides of the bird cage.

SUMMARY OF THE INVENTION

In view of the foregoing disadvantages inherent in the known types of debris catching troughs for depending below a bird cage now present in the prior art, the present invention provides a new debris catching trough construction wherein the same can be utilized for debris catching troughs for depending below a bird cage for collecting debris that falls out from the sides of the bird cage.

The general purpose of the present invention, which will be described subsequently in greater detail, is to provide a new debris catching trough apparatus and method which has many of the advantages of the debris catching troughs for depending below a bird cage mentioned heretofore and many novel features that result in a new debris catching trough which is not anticipated, rendered obvious, suggested, or even implied by any of the prior art debris catching troughs for depending below a bird cage, either alone or in any combination thereof.

To attain this, the present invention generally comprises an open ring trough having spaced apart inner and outer side walls and a bottom wall connecting the inner and outer side walls of the ring trough together, the inner side wall of the ring trough defining a central opening. A plurality of spaced apart hangers upwardly extend from the bottom face of the ring trough to permit hanging of said ring trough beneath a bird cage.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new debris catching trough apparatus and method which has many of the advantages of the debris catching troughs for depending below a bird cage mentioned heretofore and many novel features that result in a new debris catching trough which is not anticipated, rendered obvious, suggested, or even implied by any of the prior art debris catching troughs for depending below a bird cage, either alone or in any combination thereof.

It is another object of the present invention to provide a new debris catching trough which may be easily and efficiently manufactured and marketed.

It is a further object of the present invention to provide a new debris catching trough which is of a durable and reliable construction.

An even further object of the present invention is to provide a new debris catching trough which is susceptible of a low cost of manufacture with regard to both materials and labor, and which accordingly is then susceptible of low prices of sale to the consuming public, thereby making such debris catching trough economically available to the buying public.

Still yet another object of the present invention is to provide a new debris catching trough which provides in the apparatuses and methods of the prior art some of the advantages thereof, while simultaneously overcoming some of the disadvantages normally associated therewith.

Still another object of the present invention is to provide a new debris catching trough for debris catching troughs for depending below a bird cage for collecting debris that falls out from the sides of the bird cage.

Yet another object of the present invention is to provide a new debris catching trough which includes an open ring trough having spaced apart inner and outer side walls and a bottom wall connecting the inner and outer side walls of the ring trough together, the inner side wall of the ring trough defining a central opening. A plurality of spaced apart hangers upwardly extend from the bottom face of the ring trough to permit hanging of said ring trough beneath a bird cage.

Still yet another object of the present invention is to provide a new debris catching trough that catches bird droppings, bird feed, feathers, water and bedding that falls from the sides of a bird cage before the debris lands on the floor.

Even still another object of the present invention is to provide a new debris catching trough that may be constructed to have any configuration including rectangular and circular configurations to fit any shape of bird cage.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 2 is a schematic cross sectional view taken from line 2—2 of FIG. 1 illustrating the coupling of two adjacent trough segments.

FIG. 3 is a schematic perspective view of a trough segment of the rectangular embodiment of the present invention.

DESCRIPTION OF THE PREFERRED EMBODIMENT

Figure 1:
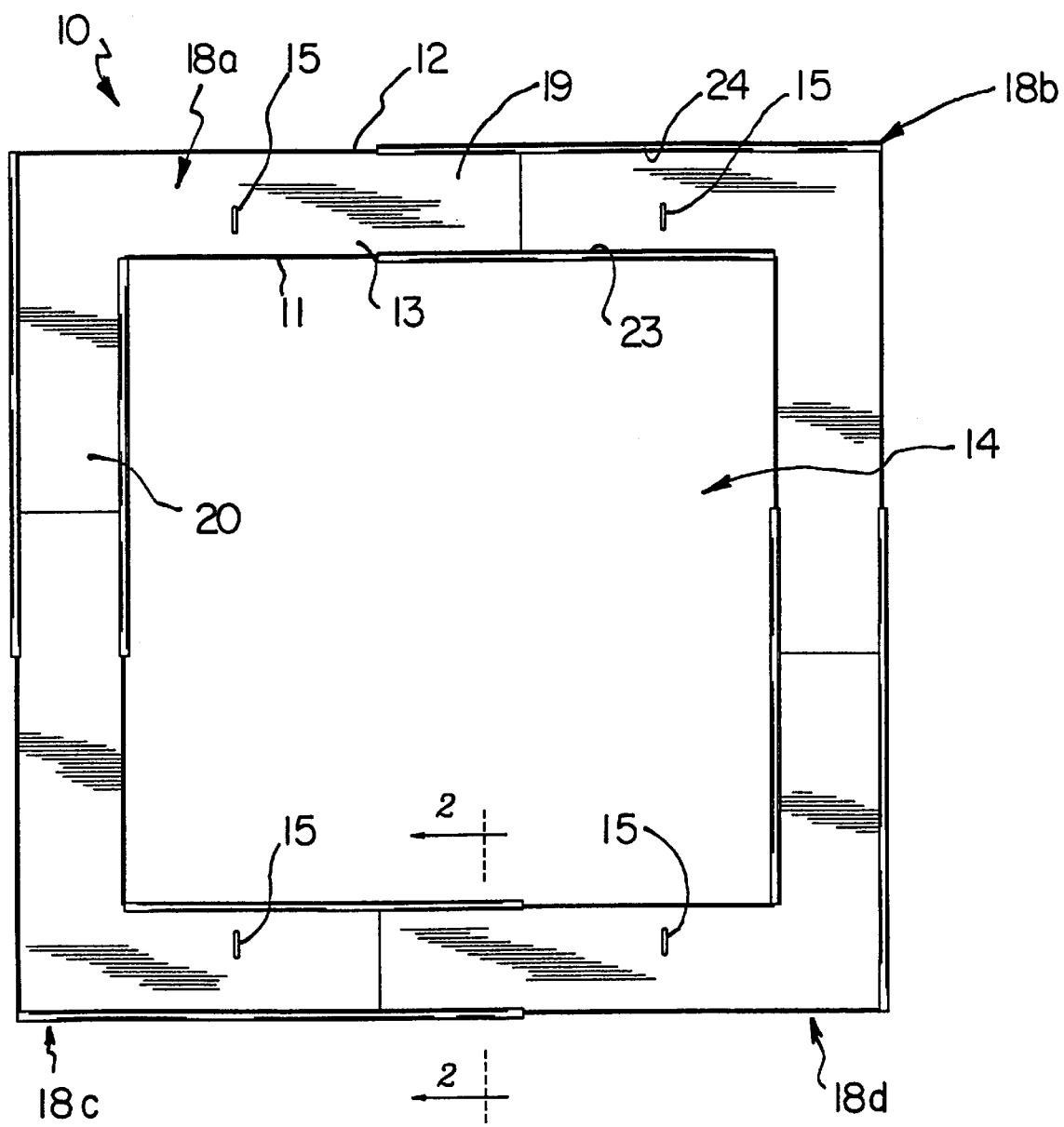
FIG. 1 is a schematic top view of a rectangular embodiment new debris catching trough according to the present invention.
Figure 4:
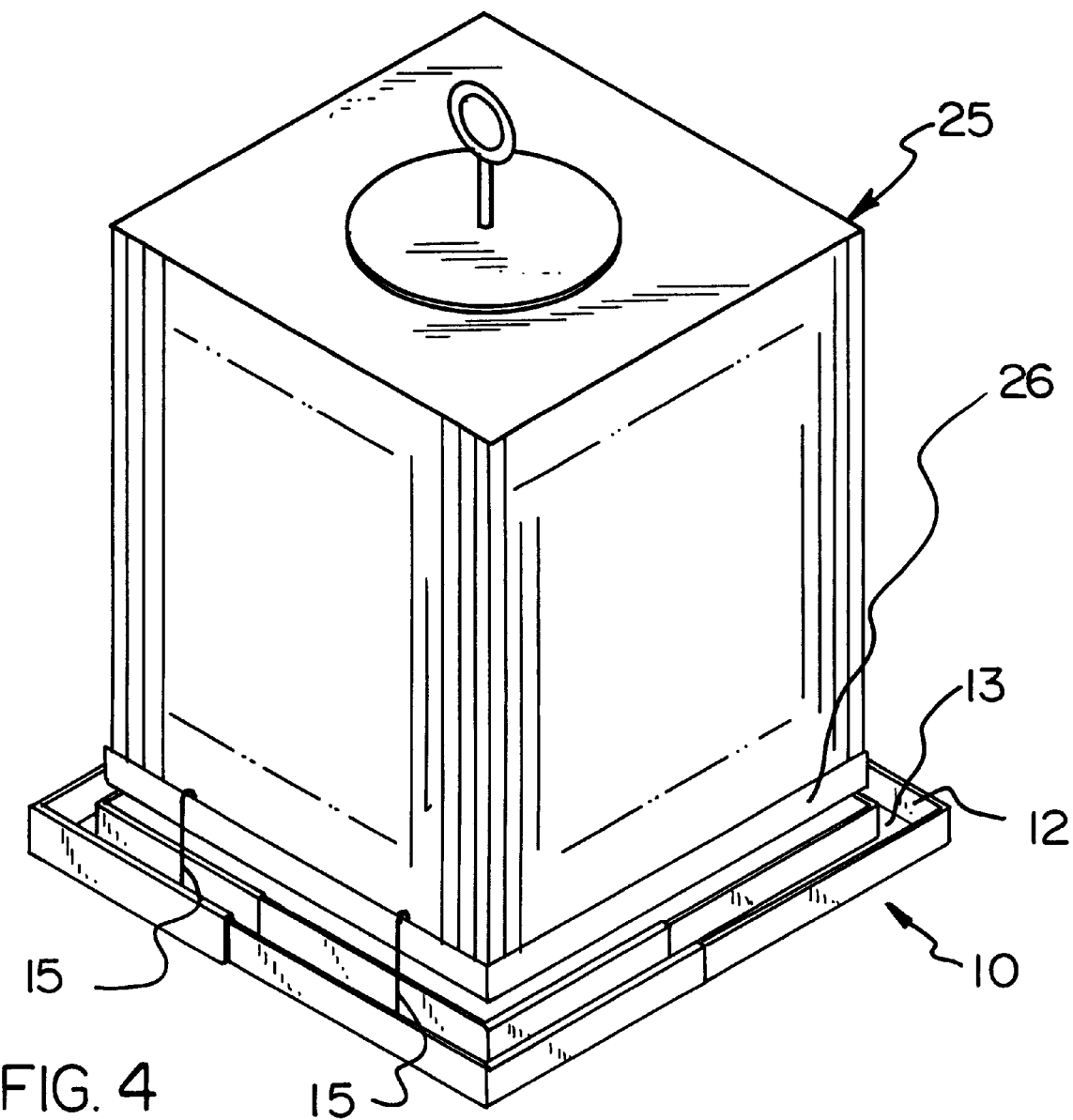
FIG. 4 is a schematic perspective view of the present invention in use suspended below a bird cage.

With reference now to the drawings, and in particular to FIGS. 1 through 4 thereof, a new debris catching trough embodying the principles and concepts of the present invention be described.

As best illustrated in FIGS. 1 through 4, the debris catching trough generally comprises an open ring trough having spaced apart inner and outer side walls and a bottom wall connecting the inner and outer side walls of the ring trough together, the inner side wall of the ring trough defining a central opening. A plurality of spaced apart hangers upwardly extend from the bottom face of the ring trough to permit hanging of said ring trough beneath a bird cage.

In closer detail, the debris catching trough comprises an open ring trough 10 having spaced apart inner and outer side walls 11,12 and a bottom wall 13 connecting the inner and outer side walls of the ring trough together. The inner side wall 11 of the ring trough defines a central opening 14. The inner and outer side walls of the ring trough are preferably extended substantially parallel to one another and substantially perpendicular to the bottom wall of the ring trough. The ring trough may have a configuration of any shape including a generally rectangular configuration or a generally circular configuration.

The inner and outer side walls each terminate at an upper edge. The inner and outer side walls each have a height defined between the bottom wall and the upper edge of the respective side wall. The height of the outer side wall is preferably greater than the height of the inner side wall. Ideally, the height of the inner side wall is about two-third the height of the outer side wall. In an ideal illustrative embodiment, the height of the inner side wall is about 2 inches and the height of the outer side wall is about 3 inches. In this ideal illustrative embodiment, the bottom wall has a preferred width defined between the inner and outer side walls of about 5 inches to provide sufficient width to collect most debris that may fall out of the sides of a bird cage.

A plurality of spaced apart hangers 15 upwardly extend from the bottom face of the ring trough. Each of the hangers has an elongate portion 16 and terminate at a hook portion 17. The elongate portions of the hangers are preferably extended substantially perpendicular to the bottom wall of the ring trough. In use, the hook portions are designed for hanging on a lower portion of a bird cage to suspend the ring trough below the bird cage.

Preferably, the ring trough comprises a plurality of separable trough segments 18a, 18b, 18c, 18d. In a rectangular embodiment, each trough segment is generally L-shaped while in a circular embodiment, each trough segment is about one-quarter of a circle shape. Preferably, as illustrated in FIG. 1, each trough segment has one of the hangers located therein.

Each trough segment has an insertion region 19 and a receiving region 20. The insertion and receiving regions each terminate at an open end 21,22. The inner and outer side walls of each trough segment each have an inwardly facing generally inverted-U-shaped upper lip 23,24. The upper lip of each inner side wall of each trough segment faces the upper lip of the outer side wall of the respective trough segment.

The open end 21 of the insertion region of each trough segment is slidably inserted into the open end 22 of the receiving region of the adjacent trough segment to connect adjacent trough segments together. Portions of the upper edges of the inner and outer side walls of each trough segment located in the insertion region are extended into the upper lip of the associated side wall of the adjacent trough segment to hold the insertion portion to the receiving portion of the adjacent trough segment as best illustrated in FIG. 2.

In use, the debris catching trough is designed for depending below a lower outer perimeter of an bird cage suspended above a floor surface. The bird cage 25 has a bottom region 26 defining an outer perimeter. The hook portions of the hangers are hung on the bottom region of the animal cage such that the animal cage is positioned above the central opening of the ring trough and the inner side wall of the ring trough is extended adjacently around the outer perimeter of the animal cage such that debris falling from the sides of the animal cage falls into the ring trough.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A debris catching trough for depending below a lower outer perimeter of an animal cage, said debris catching trough comprising:

an open trough having spaced apart inner and outer side walls and a bottom wall connecting said inner and outer side walls of said trough together, said inner side wall of said trough defining a central opening;

a plurality of spaced apart hangers upwardly extending from a bottom face of said trough; and said trough comprising a plurality of separable trough segments.

2. The debris catching trough of claim 1, wherein said inner and outer side walls of said trough are extended substantially parallel to one another and substantially perpendicular to said bottom wall of said trough.

3. The debris catching trough of claim 2, wherein said inner and outer side walls each having an upper edge, said inner and outer side walls each having a height defined between the bottom wall and the upper edge of the respective side wall, wherein said height of said outer side wall is greater than said height of said inner side wall.

4. The debris catching trough of claim 3, wherein said height of said inner side wall is about two-third said height of said outer side wall.

5. The debris catching trough of claim 1, wherein said trough has a generally rectangular configuration.

6. The debris catching trough of claim 1, wherein said trough has a generally circular configuration.

7. The debris catching trough of claim 1, wherein each of said hangers has an elongate portion and a hook portion, said elongate portions of said hangers being extended substantially perpendicular to said bottom wall of said trough.

8. The debris catching trough of claim 1, wherein each trough segment has an insertion region and a receiving region, said insertion and receiving regions each terminating at an open end, said inner and outer side walls of each trough segment having a generally inverted-U-shaped upper lip, said upper lip of each inner side wall of each trough segment facing said upper lip of said outer side wall of the respective trough segment, said insertion region of each trough segment being slidably inserted into said open end of said receiving region of the adjacent trough segment to connect adjacent trough segments together, and wherein portions of said upper edges of said inner and outer side walls of each trough segment located in said insertion region are extended into said upper lip of the associated side wall of the adjacent trough segment to hold said insertion portion to the receiving portion of the adjacent trough segment.

9. The debris catching trough of claim 1, wherein each trough segment has one of said hangers located therein.

10. A debris catching trough system, comprising:

an open trough having spaced apart inner and outer side walls and a bottom wall connecting said inner and outer side walls of said trough together, said inner side wall of said trough defining a central opening;

said inner and outer side walls of said trough being extended substantially parallel to one another and substantially perpendicular to said bottom wall of said trough;

said inner and outer side walls each having an upper edge, said inner and outer side walls each having a height defined between the bottom wall and the upper edge of the respective side wall, wherein said height of said inner side wall is about two-third said height of said outer side wall;

a plurality of spaced apart hangers upwardly extending from said bottom face of said trough, each of said hangers having an elongate portion and a hook portion, said elongate portions of said hangers being extended substantially perpendicular to said bottom wall of said trough;

said trough comprising a plurality of separable trough segments;

each trough segment having an insertion region and a receiving region, said insertion and receiving regions each terminating at an open end;

said inner and outer side walls of each trough segment having a generally inverted-U-shaped upper lip, said upper lip of each inner side wall of each trough segment facing said upper lip of said outer side wall of the respective trough segment;

said insertion region of each trough segment being slidably inserted into said open end of said receiving region of the adjacent trough segment to connect adjacent trough segments together;

portions of said upper edges of said inner and outer side walls of each trough segment located in said insertion region being extended into said upper lip of the associated side wall of the adjacent trough segment to hold said insertion portion to the receiving portion of the adjacent trough segment;

each trough segment having one of said hangers located therein; and an animal cage being suspended above a floor surface, said animal cage having a bottom region defining an outer perimeter, said hook portions of said hangers being hung on said bottom region of said animal cage such that said animal cage is positioned above said central opening of said ring trough and said inner side wall of said trough is extended adjacently around said outer perimeter of said animal cage.

* * * * *